United States Patent [19]
Seidel

[11] 3,879,689
[45] Apr. 22, 1975

[54] MATCHED PHASE SHIFTER

[75] Inventor: Harold Seidel, Warren, N.J.

[73] Assignee: Bell Telephone Laboratories, Incorporated, Murray Hill, N.J.

[22] Filed: June 21, 1974

[21] Appl. No.: 481,891

[52] U.S. Cl. .................... 333/29; 333/28 R; 333/32; 333/77; 333/78
[51] Int. Cl. .......................... H03h 7/32; H03h 7/38
[58] Field of Search ......... 333/28, 29, 32, 70 R, 77, 333/78

[56] References Cited

UNITED STATES PATENTS 3,514,722 5/1970 Cappucci .......................... 333/77 X

FOREIGN PATENTS OR APPLICATIONS 116,338 1/1943 United Kingdom .................. 333/29

*Primary Examiner*—James W. Lawrence
*Assistant Examiner*—Marvin Nussbaum
*Attorney, Agent, or Firm*—S. Sherman

[57] ABSTRACT

An impedance matched phase shifter is realized by the use of dual reactances. In one embodiment one of the reactances is connected in parallel with the series-aiding connected windings of 1:1 turns ratio transformer. The second reactance is connected between the common junction of the two transformer windings and ground. In a second embodiment, a phase shifter employing a three-winding transformer is disclosed for coupling between circuits having different impedance levels.

3 Claims, 6 Drawing Figures

MATCHED PHASE SHIFTER

This invention relates to broadband, matched, phase shifters.

BACKGROUND OF THE INVENTION

For high quality transmission over long distances, it is highly desirable to correct the phase distortion experienced by the transmitted signal. This is accomplished by inserting phase shift networks in the wavepath at selected locations. When used for this purpose, a phase shift network is called a delay equalizer.

In other situations, it may be desirable to equalize the relative delay of signals in two different wavepaths as, for example, in a feedforward amplifier. For this purpose, a phase shifter is located in each of the two wavepaths to produce a specified relative phase shift between the two signals.

In either of the above-described applications, and in the many other applications well known to those skilled in the art, the phase shift network, in addition to producing the required phase shift, advantageously has an impedance that is matched to the impedance of the transmission path in which it is located. For many types of phase shift networks, such as, for example, the bridged-T phase shifter, these two requirements cannot always be simultaneously satisfied. That is, the circuit solution is physically unrealizable in some cases because the same circuit components, which play a part in determining both the phase shift and the impedance, cannot be independently defined.

It is, accordingly, the broad object of the present invention to produce a phase shift by means of a matched circuit wherein the components which define the circuit characterics can be independently chosen.

SUMMARY OF THE INVENTION

A phase shifter, in accordance with one embodiment of the present invention, comprises a tightly coupled 1:1 turns ratio transformer and a pair of dual reactive networks. The two transformer windings are connected series-aiding so that the magnetic fields produced by a common current flowing therethrough add constructively. One of the networks is connected across the series-connected transformer windings forming at one end a first common junction and at the other end a second common junction. The other network is connected between the junction of the two windings and a third common junction, where the first and third junctions constitute one port of the phase shifter, and the second and third junctions form the other port of the phase shifter.

It is an advantage of this circuit that the condition for an impedance match does not depend upon the impedances of the two networks but only upon their dual relationship. Thus, their impedances can be independently selected to satisfy the desired phase shift requirements. The match condition is then automatically realized without imposing any additional requirements or restrictions upon the circuit parameters. Inasmuch as the dual relationship can be established and maintained over a very broad band of interest, the impedance match can likewise be maintained over an equally broad band.

In a second embodiment of the invention, a three-winding transformer, whose turns are in the ratio of 1:1:N, is used. The dual networks are connected, respectively, to the ends of the series-connected 1:1 turns ratio windings. By suitable selection of the turns ratio of the third winding relative to the series-connected windings, the phase shifter can be used between two circuits having different impedance levels. Specifically, a first circuit, having an impedance $Z_0$, is connected to the junction of the series-connected windings. A second circuit, having an impedance $Z'_0$, is connected across the third transformer winding where $$N = \sqrt{\frac{Z'_0}{Z_0}}.$$

The phase shift $\phi$ is then $$\phi = 2 \arctan X/Z_0$$

where X is the impedance of one of the reactive networks dualized with respect to $Z_0$.

These and other objects and advantages, the nature of the present invention and its various features will appear more fully upon consideration of the various illustrative embodiments now to be described in detail in connection with the accompanying drawings.

DETAILED DESCRIPTION

Figure 1:
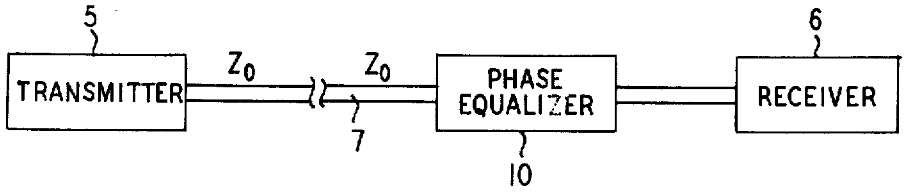
FIG. 1 shows an electromagnetic wave transmission system including therein a phase equalizer.

Referring to the drawings, FIG. 1 shows, in block diagram, an electromagnetic wave transmission system including a signal transmitter 5, a signal receiver 6, and a wave transmission line 7 connecting the transmitter to the receiver. To compensate for any phase distortion introduced by the transmission line, a phase equalizer 9 is advantageously included at the receiver end of the line. The equalizer is designed to introduce a phase shift over the operating frequency band of interest which compensates for the phase distortion produced by line 7. In addition, the input and output impedances of the equalizer are advantageously matched to the transmission line so as to avoid introducing reflections.

Figure 2:
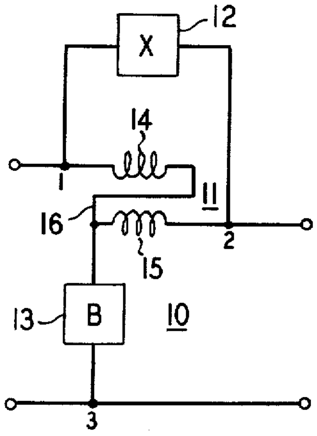
FIG. 2 shows, in greater detail, one embodiment of a phase shifter in accordance with the present invention.
Figure 3:
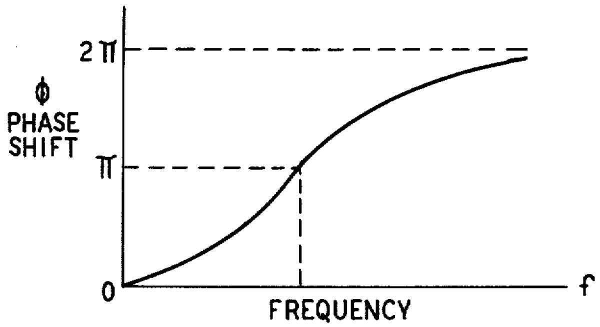
FIG. 3 shows, by way of example, a particular phase shift characteristic.

FIG. 2, now to be considered, shows, in greater detail, a phase shift network in accordance with one embodiment of the present invention. As shown, phase shift network 10 comprises a tightly coupled 1:1 turns ratio transformer 11, and a pair of reactive networks 12 and 13. The two transformer windings 14 and 15 are connected series-aiding so that the magnetic fields produced by a common current flowing therethrough add constructively. This connection is indicated by a conductor 16 which connects one end of winding 14 to the opposite end of winding 15.

One of the networks 12 is connected across the series-connected transformer windings forming at one end a first common junction 1 and at the other end a second common junction 2. The other impedance 13 is connected between conductor 16 and a third common junction 3, where junctions 1–3 and junction 2–3 constitutes the two ports of phase shifter 10.

For purpose of explanation, let us consider a system of characteristic impedance $Z_o$ in which reactive network 12 has a reactance X and reactive network 13 has a susceptance B. When terminated by the characteristic impedance $Z_o$, phase shifter 10 has an input impedance Z given by $$\frac{Z}{Z_o} = \frac{1 + \frac{1}{2}\left[\left(\frac{iX-Z_o}{iX+Z_o}\right) - \left(\frac{iB-1/Z_o}{iB+1/Z_o}\right)\right]}{1 - \frac{1}{2}\left[\left(\frac{iX-Z_o}{iX+Z_o}\right) - \left(\frac{iB-1/Z_o}{iB+1/Z_o}\right)\right]} \quad (1)$$

The preferred matched condition, $Z = Z_o$, is obtained when $$\frac{X}{Z_o} = BZ_o. \quad (2)$$

That is, phase shifter 10 is matched to the system impedance when networks 12 and 13 bear a dual relationship relative to the characteristic impedance $Z_o$. The phase shift $\phi$ produced is given by either $$\phi = 2 \arctan X/2Z_o \quad (3)$$

or $$\phi = 2 \arctan BZ_o 12 \quad (4)$$

since, from equation (2), $X/Z_o = BZ_o$.

The thing to be noted about this phase shifter is that the match condition does not depend upon the impedances of networks 12 and 13 but only upon their dual relationship. Thus, these impedances can be independently selected to satisfy the desired phase shift requirements. The match condition is then automatically realized without imposing any additional requirements or restrictions upon the circuit parameters.

EXAMPLE

Assume a desired phase shift characteristic $\phi = 2$ arctan $(-irp/1+p^2)$. This function is illustrated graphically in FIG. 2.

From equation (4) we have $$\frac{iX}{2Z_o} = \frac{rp}{1+p^2} \quad (5)$$

where $p = i\omega$.

This can be rewritten as $$iX = \frac{1}{\frac{1}{2rpZ_o} + \frac{p}{2rZ_o}} \quad (6)$$

which is the equivalent of a capacitor of capacitance $1/2rZ_o$ in parallel with an inductor of inductance $2rZ_o$. The dual of this is a capacitor of capacitance $2r/Z_o$ in series with an inductor of inductance $Z_o/2r$. Thus, the phase shifter, in accordance with the present invention, includes the above-described two circuits as illustrated in FIG. 4.

It will be noted that the criteria for duality are independent of frequency. As such, the impedance match is maintained over a broad frequency band of interest.

Figure 4:
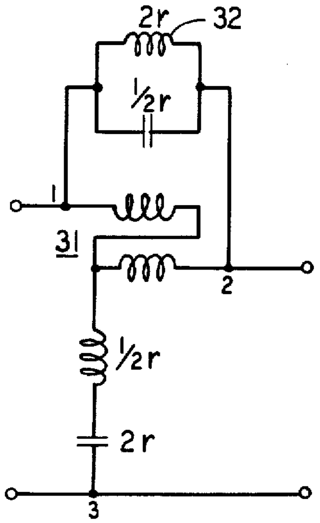
FIG. 4 shows the particular impedances for obtaining the phase shift characteristic of FIG. 3 in accordance with the present invention.

It will also be noted in FIG. 4 that the inductor 32 is in parallel with the transformer 31. As such, the core reactance of the latter can be designed to incorporate all or a portion of the inductance of inductor 32. Thus, in some embodiments inductor 32 may not exist as a discrete component.

Figure 5:
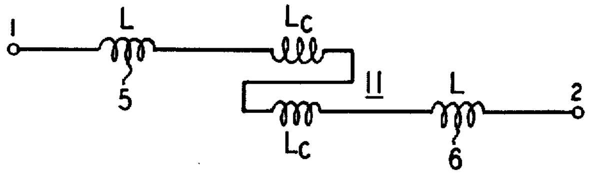
FIG. 5 shows the equivalent circuit of a transformer.

The above analysis and examples are based upon the assumption that the coupling coefficient $k$ between transformer windings 14 and 15 is equal to unity. If, on the other hand, $k$ is less than unity, the equivalent circuit of transformer 11 must be modifiid to include an equivalent leakage inductor in series which each of the transformer windings 14 and 15, as illustrated by the inductors 5 and 6 in FIG. 5. The magnitude of each leakage inductor is given by $$L_1 = L_c (1-k) \quad (7)$$

where $L_c$ is the inductance of each transformer winding.

While it may be possible, in some cases, to incorporate this inductance into network 13, this is not always possible. If, for example, network 13 does not include a simple series inductor, the presence of a significant leakage inductor would tend to upset the dual relationship between networks 12 and 13. Thus, $k$ is advantageously made as large as possible. Preferable, $k$ is made equal to or greater than 0.97. Accordingly, as used herein, the term "tightly coupled" shall be understood to mean a coefficient of coupling given by $0.97 \leq k \leq 1$. This, it will be noted, is in contrast to the prior art wherein $k$ is made as small as possible. See, for example, "Communication Networks" Vol. II by E. A. Guillemin, published by John Wiley & Sons, Inc., page 543.

Figure 6:
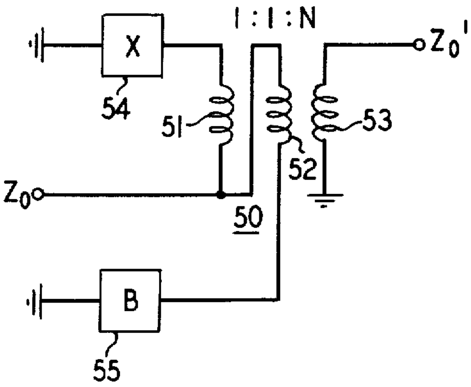
FIG. 6 shows a second embodiment of the invention.

FIG. 6 shows a second embodiment of the invention comprising a tightly coupled three-winding transformer 50 whose turns are in the ratio 1:1:N. The 1:1 turns ratio windings 51 and 52 are connected series-aiding. A first reactive network 54, of magnitude X, is connected between one end of the series-connected windings and ground. A second reactive network 55, having a susceptance B, is connected to the other end of the series-connected windings and ground, where $$\frac{X}{Z_o} = BZ_o \quad (8)$$

and $Z_o$ is the impedance level of the circuit connected between the common junction of windings 51 and 52 and ground.

A second circuit, having an impedance level $Z'_o$ is connected across the third transformer winding 53. An impedance match to both circuits is obtained when $$N = \sqrt{Z_o'/Z_o}. \quad (9)$$

The phase shift through the network is given by $$\phi = 2 \arctan \frac{X}{2Z_o}. \quad (10)$$

As in the embodiment of FIG. 2, the two reactive networks 54 and 55 are selected to produce the desired phase shift $\phi$. The impedance match is obtained independently by virtue of their dual properties and the transformer turns ratio.

It will be recognized that phase shifters of the type disclosed herein can be used singly to produce a prescribed phase shift, or in pairs to produce a prescribed differential phase shift between signals in two different wavepaths.

It will also be noted that in each of the embodiments the 1:1 turns ratio transformer can be replaced by a center-tapped inductor provided that the two halves of the inductor are tightly coupled such that the leakage inductance is minimal for the reasons explained hereinabove.

Thus, in all cases, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. A phase shifter having a phase shift $\phi$=2 arctan $X/2Z_o$ over a prescribed frequency band of interest comprising:

a tightly coupled two-winding transformer having a 1:1 turns ratio;

one end of one transformer winding being connected to one end of the other transformer winding to form a series-aiding connection;

a first reactive network having a reactance X being connected between the other ends of said series-connected transformer windings thereby forming at one connection a first common junction and at the other connection a second common junction;

and a second reactive network, having a susceptance B such that $X/Z_o$=$BZ_o$, being connected between said one ends of said transformer windings and a third common junction;

said first and said third common junctions constituting a first port of said phase shifter;

said second and said third common junctions constituting a second port of said phase shifter.

2. The phase shifter according to claim 1 where said first reactive network includes an inductance connected across said series-connected windings;

and wherein said inductance is provided at least in part by the core inductance of said transformer windings.

3. A phase shifter having a phase shift $\phi$=2 arctan X over a prescribed band of frequencies and adapted for matching a first circuit having an impedance $Z_o$ to a second circuit having an impedance $Z'_o$ comprising:

a three-winding transformer whose turns are in the ratio of 1:1:N, where N= $\sqrt{Z_o'/Z_o}$;

said 1:1 turns ratio windings being tightly coupled and connected series-aiding;

a first network, having an impedance X, connected between one end of said series-connected windings and common junction;

a second network, having a susceptance B where $X/2Z_o$=$2Z_oB$ over said frequency band of interest, being connected between the other end of said series-connected windings and said common junction;

wherein the junction of said series-connected windings and said common junction constitute the connecting port for said first circuit;

and wherein the terminals of said third winding constitute the connecting port for said second circuit.

* * * * *